(12) United States Patent
Hosotani

(10) Patent No.: US 9,473,041 B2
(45) Date of Patent: *Oct. 18, 2016

(54) SWITCHING POWER SUPPLY APPARATUS WITH IMPROVED POWER CONVERSION EFFICENCY TO REDUCE POWER USAGE

(71) Applicant: Murata Manufacturing Co., Ltd., Nagaokakyo-shi, Kyoto-fu (JP)

(72) Inventor: Tatsuya Hosotani, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 143 days.

This patent is subject to a terminal disclaimer.

(21) Appl. No.: 14/336,065

(22) Filed: Jul. 21, 2014

(65) Prior Publication Data

US 2014/0328098 A1    Nov. 6, 2014

Related U.S. Application Data

(63) Continuation of application No. PCT/JP2012/080269, filed on Nov. 22, 2012.

(30) Foreign Application Priority Data

Jan. 23, 2012    (JP) .................................. 2012-010633

(51) Int. Cl.
*H02M 3/24*    (2006.01)
*H02M 3/335*    (2006.01)
(Continued)

(52) U.S. Cl.
CPC ............. *H02M 7/217* (2013.01); *H01M 10/44* (2013.01); *H02J 7/0068* (2013.01); *H02J 7/0081* (2013.01);
(Continued)

(58) Field of Classification Search
CPC .................. H02M 2001/007; H02M 3/33507; H02M 3/33515; H02M 3/33523; H02M 3/33569; H02M 3/33576
See application file for complete search history.

(56) References Cited

U.S. PATENT DOCUMENTS 5,515,261 A * 5/1996 Bogdan ............... H02M 1/4225
                                                323/222
5,896,278 A    4/1999 Tamura et al.
(Continued)

FOREIGN PATENT DOCUMENTS

JP    10-271713 A    10/1998
JP    2000-004547 A    1/2000
(Continued)

OTHER PUBLICATIONS

English JP2010041826, Mori Iichiro, AC-DC converter and electronic apparatus using the same, 2010.*
(Continued)

*Primary Examiner* — Timothy J Dole
*Assistant Examiner* — Ishrat Jamali
(74) *Attorney, Agent, or Firm* — Keating & Bennett, LLP

(57) ABSTRACT

A switching power supply apparatus includes an isolated converter with efficiency characteristics in which power conversion efficiency of a rated load is higher than power conversion efficiency of a light load and that converts power-supply voltage into direct-current voltage to output the direct-current voltage, a secondary battery that stores the direct-current voltage output from the isolated converter; a voltage detector that detects an amount of charge in the secondary battery; and a controller that switches driving and stopping of the isolated converter on the basis of the detected amount of charge.

16 Claims, 11 Drawing Sheets

(51) Int. Cl.
*H02M 7/217* (2006.01)
*H01M 10/44* (2006.01)
*H02J 7/00* (2006.01)
*H02J 9/00* (2006.01)
*H02M 1/00* (2006.01)
*H02J 7/34* (2006.01)

(52) U.S. Cl.
CPC ............... *H02J 9/005* (2013.01); *H02M 3/24* (2013.01); *H02M 3/33507* (2013.01); *H02M 3/33515* (2013.01); *H02M 3/33576* (2013.01); *H02J 7/345* (2013.01); *H02M 3/33523* (2013.01); *H02M 3/33569* (2013.01); *H02M 2001/007* (2013.01); *H02M 2001/0035* (2013.01); *Y02B 70/16* (2013.01)

(56) References Cited

U.S. PATENT DOCUMENTS

| | | | |
|---|---|---|---|
| 6,115,276 A * | 9/2000 | Mao | H02J 9/062 363/127 |
| 9,054,556 B2 * | 6/2015 | Hoshino | H02J 7/34 |
| 2002/0023235 A1 | 2/2002 | Odaohhara | |
| 2004/0227496 A1 * | 11/2004 | Hosotani | H02M 1/4208 323/282 |
| 2007/0047100 A1 * | 3/2007 | Takahashi | H02J 9/061 359/689 |
| 2007/0194759 A1 * | 8/2007 | Shimizu | H02J 7/0016 320/166 |
| 2008/0036432 A1 * | 2/2008 | Takada | H01M 8/04559 323/234 |
| 2009/0243390 A1 * | 10/2009 | Oto | H02J 7/34 307/43 |
| 2010/0091530 A1 | 4/2010 | Yoshida et al. | |
| 2010/0231431 A1 | 9/2010 | Sakamoto et al. | |
| 2011/0127943 A1 * | 6/2011 | Oto | H01M 10/44 320/101 |

FOREIGN PATENT DOCUMENTS

| | | |
|---|---|---|
| JP | 2000-116029 A | 4/2000 |
| JP | 2002-062952 A | 2/2002 |
| JP | 2010-041826 A | 2/2010 |
| JP | 2010-220347 A | 9/2010 |
| WO | 2008/041666 A1 | 4/2008 |

OTHER PUBLICATIONS

Official Communication issued in International Patent Application No. PCT/JP2012/080269, mailed on Feb. 12, 2013.

* cited by examiner

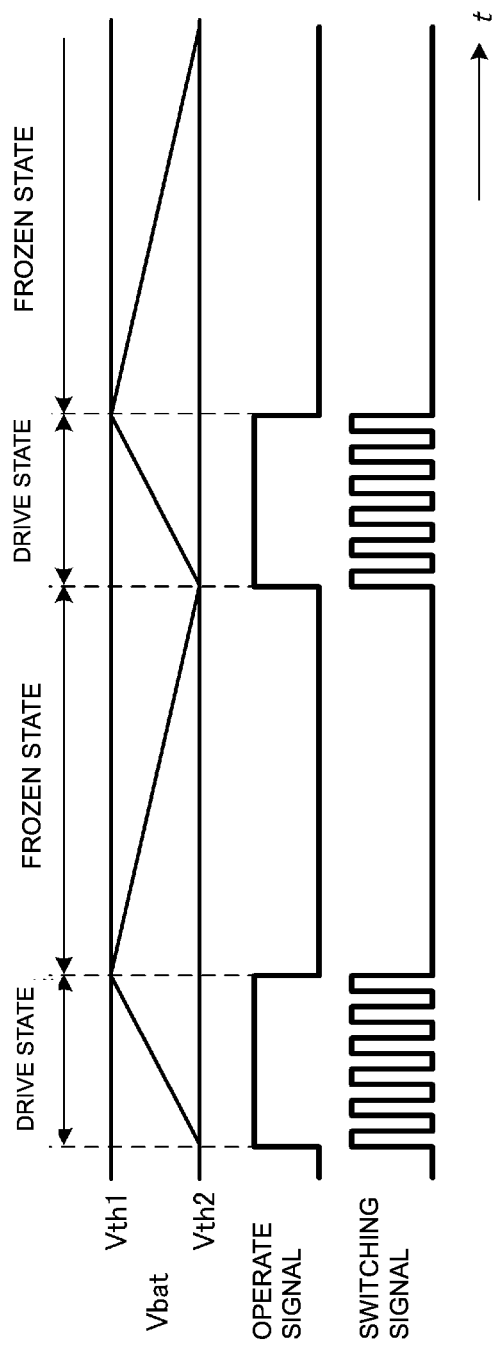

SWITCHING POWER SUPPLY APPARATUS WITH IMPROVED POWER CONVERSION EFFICENCY TO REDUCE POWER USAGE

BACKGROUND OF THE INVENTION

1. Field of the Invention

The present invention relates to a switching power supply apparatus capable of improving its power conversion efficiency to reduce power usage.

2. Description of the Related Art

It is desirable in recent years to reduce power loss when an apparatus is not used in terms of energy saving. Japanese Unexamined Patent Application Publication No. 2002-62952 discloses an apparatus that stops supply of power from a power supply unit, such as an analog-to-digital adapter, to a system at power-off or at light-load and supplies the power from a battery that is charged to the system to reduce the power loss.

However, the apparatus described in Japanese Unexamined Patent Application Publication No. 2002-62952 performs control so as to switch the supply of the power from the power supply unit to the battery depending on the state of the load, regardless of the state of charge and discharge of the battery. Accordingly, there are problems in that it is not possible to effectively use the energy of the battery and, thus, the reduction effect of the power usage is small. In addition, the apparatus described in Japanese Unexamined Patent Application Publication No. 2002-62952 has problems in that, since it is necessary to provide a circuit to control the charge and discharge of the battery or a circuit to control output voltage from the battery, the power conversion efficiency at the light-load is degraded to increase the power usage per unit period, for example, the annual power usage, compared with a case in which the power is directly supplied from the power supply unit to the load.

SUMMARY OF THE INVENTION

Preferred embodiments of the present invention provide a switching power supply apparatus capable of effectively reducing the power usage.

According to a preferred embodiment of the present invention, a switching power supply apparatus includes a first converter that has efficiency characteristics in which power conversion efficiency of a rated load is higher than power conversion efficiency of a light load and that converts power-supply voltage that is input into direct-current voltage to output the direct-current voltage; a charge unit configured to store the direct-current voltage output from the first converter; an amount-of-charge detecting unit configured to detect an amount of charge in the charge unit; and a controller configured and programmed to switch driving and stopping of the first converter on the basis of the amount of charge detected by the amount-of-charge detecting unit. The controller is configured and programmed to stop the first converter if the amount of charge in the charge unit is higher than a first threshold value and drives the first converter if the amount of charge in the charge unit is lower than a second threshold value. The controller is configured and programmed to output the direct-current voltage subjected to the conversion in the first converter and stores the direct-current voltage subjected to the conversion in the first converter in the charge unit when the first converter is driven and outputs the direct-current voltage stored in the charge unit when the first converter is stopped. A frozen period during which the first converter is stopped to be in a frozen state is controlled depending on increase and decrease of output power and the frozen period is lengthened with the decreasing output power.

With the above configuration, the direct-current voltage is output from the first converter or the charge unit depending on the amount of charge in the charge unit. For example, regardless of the light load or heavy load (the rated load) at the load side, the direct-current voltage is supplied from the charge unit to the load if the amount of charge in the charge unit is in the full charge (is higher than the first threshold value) and the direct-current voltage output from the first converter is supplied to the load if the amount of charge in the charge unit is lower than the second threshold value. In other words, since the configuration in which the charge unit is used when the load is capable of being driven with the amount of charge in the charge unit is adopted, it is possible to constantly operate the first converter in a high-efficiency state to reduce the accumulated power usage.

The switching power supply apparatus may further include a voltage conversion unit configured to perform voltage conversion of the direct-current voltage output from the charge unit.

With the above configuration, it is possible to keep the output with high accuracy, for example, it is possible to output constant voltage even if the direct-current voltage from the charge unit is varied.

The voltage conversion unit may be a DC-DC converter, for example.

With the above configuration, it is possible to reduce the power loss, for example, compared with a case in which the voltage control is performed in a dropper method, to reduce the accumulated power usage.

The switching power supply apparatus may further include an isolated second converter. The first converter, the charge unit, and the controller may be provided at a primary side of the second converter.

With the above configuration, when the size of the circuit board is specified, it is possible to prevent the size at the secondary side from being increased due to the arrangement of the first converter, etc. at the secondary side of the second converter.

The charge unit may be a secondary battery.

With the above configuration, the secondary battery is used to increase the amount of charge, thus further lengthening the time during which the direct-current voltage is supplied from the secondary battery to the load. As a result, the time during which the first converter is driven is shortened to reduce the accumulated power usage of the switching power supply apparatus.

The charge unit may be a capacitor.

With the above configuration, since the capacitor has a long life even with the increasing number of times of charge and discharge (the characteristics degradation is suppressed), compared with the secondary battery, it is possible to lengthen the lives of the switching power supply apparatus and the charge unit.

The charge unit may be an electric double layer capacitor.

With the above configuration, it is possible to increase the amount of charge, compared with normal capacitors, to lengthen the time during which the voltage is supplied from the electric double layer capacitor to the load. Accordingly, the time during which the power is supplied from the charge unit to the load is lengthened and the ratio of the period during which the first converter operates is relatively reduced to reduce the accumulated power usage.

A rectifier circuit in the first converter may be a synchronous rectifier circuit.

With the above configuration, it is possible to reduce voltage drop when current flows and the loss in the rectifier device, compared with diode rectification (asynchronous rectification), to realize high efficiency.

The switching power supply apparatus may further include an output power detecting unit configured to detect output voltage to an external load; and a charge stopping unit configured to stop supply of the direct-current voltage to the charge unit when the charge unit is in full charge. The controller may be configured and programmed to forcedly drive the first converter regardless of the amount of charge in the charge unit if the output voltage detected by the output power detecting unit exceeds a third threshold value.

In the case in which the output power is high (exceeds the third threshold value), the rate of discharge from the charge unit is high and the time before the amount of charge in the charge unit is made lower than the second threshold value is shortened when the direct-current voltage is supplied from the charge unit to the load. Accordingly, the control in which the charge into the charge unit is started immediately after the discharge from the charge unit is started is repeated. As a result, the number of times of charge and discharge into and from the charge unit is increased to decrease the life of the charge unit. Consequently, when the output power is high, the discharge from the charge unit is stopped and the direct-current voltage from the first converter is supplied to the load, regardless of the amount of charge in the charge unit, to reduce the number of times of charge and discharge into and from the charge unit. When the charge unit is in the full charge, stopping the charge into the charge unit prevents overcharge to protect the charge unit.

The switching power supply apparatus may further include a state determining unit configured to determine whether an external load is in a rated load state or in a light load state; and a charge stopping unit configured to stop the supply of the direct-current voltage to the charge unit if the charge unit is in full charge. The controller may be configured and programmed to forcedly drive the first converter regardless of the amount of charge in the charge unit if the state determining unit determines that the external load is in the rated load state.

In the rated load state, the rate of discharge from the charge unit is high and the time before the amount of charge in the charge unit is made lower than the second threshold value is shortened when the direct-current voltage is supplied from the charge unit to the load. Accordingly, the control in which the charge into the charge unit is started immediately after the discharge from the charge unit is started is repeated. As a result, the number of times of charge and discharge into and from the charge unit is increased to decrease the life of the charge unit. Consequently, when the output power is high, the discharge from the charge unit is stopped and the direct-current voltage from the first converter is supplied to the load, regardless of the amount of charge in the charge unit, to reduce the number of times of charge and discharge into and from the charge unit. When the charge unit is in the full charge, stopping the charge into the charge unit prevents the overcharge to protect the charge unit.

According to various preferred embodiments of the present invention, a configuration is adopted in which a stop period during which the first converter is stopped is controlled depending on the amount of power consumed by the load, the power is supplied with the charge unit during the stop period, and the power is supplied not only to the load but also to the charge unit during an operation period in which the first converter operates. Accordingly, it is possible to use the first converter in a high power conversion efficiency state to reduce the accumulated power usage.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6B is another diagram illustrating the periods of the frozen state and the drive state.

DETAILED DESCRIPTION OF THE PREFERRED EMBODIMENTS

First Preferred Embodiment

Figure 1:
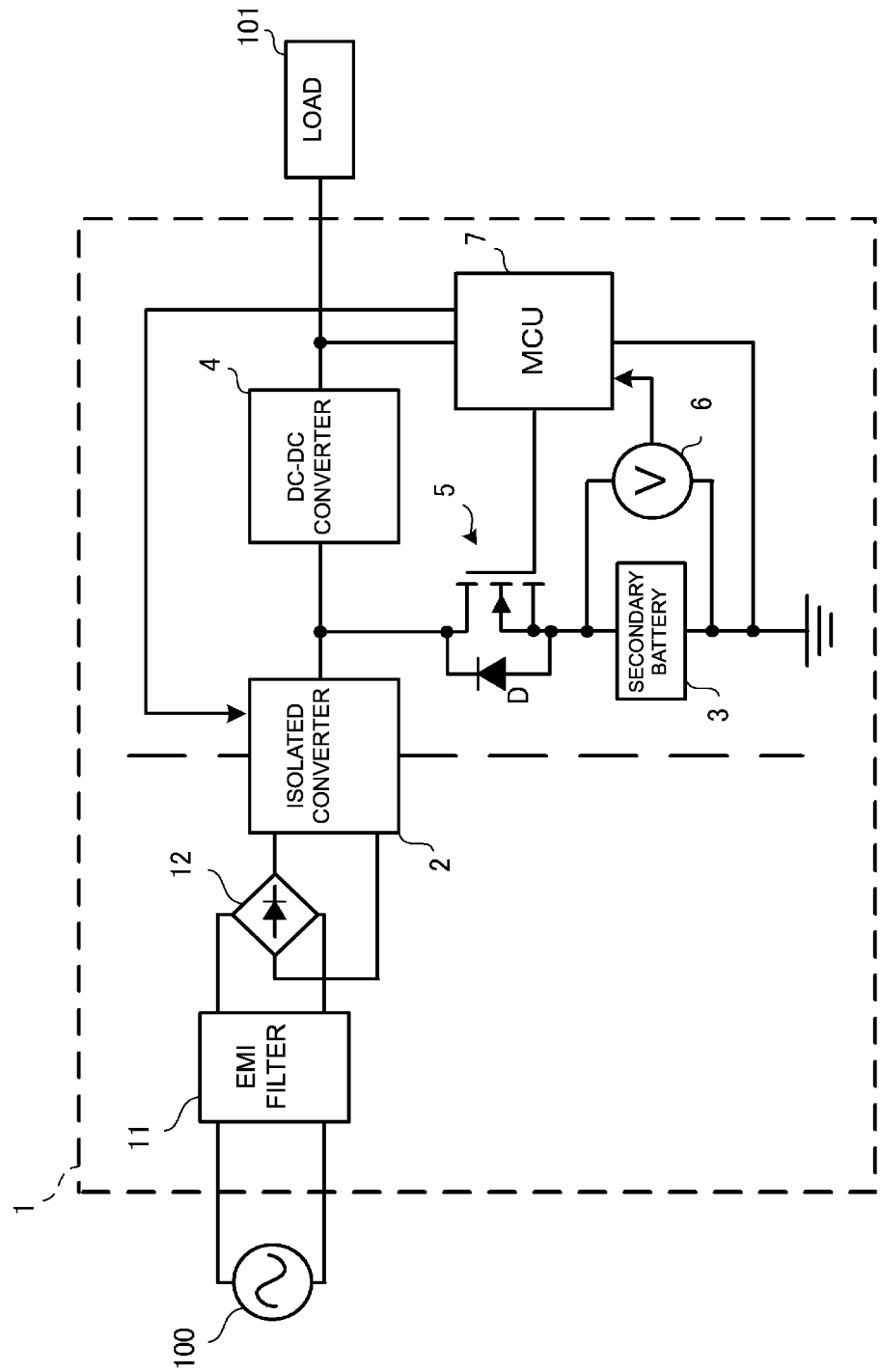
FIG. 1 is a circuit diagram of a switching power supply apparatus according to a first preferred embodiment of the present invention.

FIG. 1 is a circuit diagram of a switching power supply apparatus according to a first preferred embodiment of the present invention. A switching power supply apparatus 1 converts alternating-current voltage (power-supply voltage) supplied from a commercial power supply 100 into direct-current voltage to supply the direct-current voltage to a load 101. The commercial power supply 100 is, for example, an alternating-current power supply of 100 V to 230 V. The switching power supply apparatus 1 is preferably used in an electronic device, such as a multifunctional machine, including a controller.

The switching power supply apparatus 1 includes an isolated converter 2 (a first converter). The isolated converter 2 is, for example, a direct current (DC)-DC converter including a converter transformer. A rectifier circuit at a secondary side of the isolated converter 2 is, for example, a synchronous rectifier circuit. The isolated converter 2 according to the present preferred embodiment has efficiency characteristics in which the power conversion efficiency of a rated load is higher than the power conversion efficiency of a light load. Since the isolated converter 2 adopts the synchronous rectification mode, it is possible for the isolated converter 2 to reduce the loss in the rectifier device to realize high efficiency, compared with diode rectification (asynchronous rectification). The configuration of the isolated converter 2 is not specifically limited and may be appropriately varied.

The switching power supply apparatus 1 includes an electromagnetic interference (EMI) filter 11 and a diode bridge circuit 12 at its primary side. The commercial power supply 100 is connected to the EMI filter 11 to prevent leakage or invasion of noise through wiring. The diode bridge circuit 12 performs full-wave rectification to the alternating-current voltage from which the noise is reduced in the EMI filter 11 to supply the alternating-current voltage subjected to the full-wave rectification to the isolated converter 2.

The switching power supply apparatus 1 includes a secondary battery (a charge unit) 3, a DC-DC converter (a voltage conversion unit) 4, a switch (a charge stopping unit) 5, a voltage detector (an amount-of-charge detecting unit) 6, and a micro control unit (MCU) 7 at its secondary side. The voltage detector 6 supplies charge voltage in the secondary battery 3 to the MCU 7. The MCU (a controller) 7 includes, for example, a digital signal processor (DSP) and is programmed to control driving of the isolated converter 2 and turning on and off of the switch 5 on the basis of the amount of charge in the secondary battery 3, which is based on the voltage supplied from the voltage detector 6.

The switch 5 is an n-type metal oxide semiconductor field effect transistor (MOSFET). The drain of the n-type MOSFET is connected to the isolated converter 2, the source thereof is connected to the secondary battery 3, and the gate thereof is connected to the MCU 7. In response to turning on or off of the switch 5, the secondary battery 3 is charged with the direct-current voltage supplied from the isolated converter 2, discharges (outputs) the direct-current voltage that is charged, or stops the charge.

The DC-DC converter 4 is connected to the isolated converter 2. The DC-DC converter 4 converts the direct-current voltage supplied from the isolated converter 2 or the secondary battery 3 to supply the voltage subjected to the voltage conversion to the load 101. The use of the DC-DC converter 4 for the voltage conversion of the direct-current voltage supplied from the input side allows the power efficiency to be improved, compared with a case in which a dropper method is used, and a decrease in size of the DC-DC converter 4 allows space saving to be realized.

In the switching power supply apparatus 1 having the above configuration, if the amount of charge in the secondary battery 3 determined on the basis of the voltage detected by the voltage detector 6 is lower than a threshold value (a second threshold value), the MCU 7 causes the isolated converter 2 to operate to turn on the switch 5. This threshold value is, for example, the amount of charge in the secondary battery 3 with which the voltage allowing the load 101 to be driven can be supplied. The direct-current voltage that is output from the isolated converter 2 and that is subjected to the voltage conversion in the DC-DC converter 4 is supplied to the load 101 at this time. Concurrently, the direct-current voltage output from the isolated converter 2 is supplied to the secondary battery 3 to cause the secondary battery 3 to start the charge. A state in which the switch of the isolated converter 2 is turned on and the voltage from the commercial power supply 100 is being supplied to the load 101 is hereinafter referred to as a drive state of the switching power supply apparatus 1.

Upon detection of full charge of the secondary battery 3 on the basis of the result of the detection by the voltage detector 6, the MCU 7 causes the isolated converter 2 to stop the operation to turn off the switch 5 so as not to cause overcharge of the secondary battery 3. The MCU 7 may cause the isolated converter 2 to stop the operation to turn off the switch 5 if the amount of charge in the secondary battery 3 is higher than an amount of charge close to the full charge (a first threshold value), instead of the full charge of the secondary battery 3. Although the direct-current voltage output from the isolated converter 2 is not supplied to the load 101 at this time, the direct-current voltage stored in the secondary battery 3 is supplied to the load 101 through a body diode D of the switch 5 even if the switch 5 is turned off.

The MCU 7 turns on the switch 5 in the state in which the operation of the isolated converter 2 is stopped. The direct-current voltage stored in the secondary battery 3 is supplied to the load 101 through the source and the drain of the switch 5 at this time. A state in which the operation of the isolated converter 2 is stopped and the voltage stored in the secondary battery 3 is being supplied to the load 101 is hereinafter referred to as a frozen state of the isolated converter 2.

When the switch 5 is turned on in the frozen state of the isolated converter 2 and current flows between the source and the drain of the switch 5, conduction loss caused by forward voltage of the diode is suppressed, compared with a case in which current flows through the body diode D of the switch 5, to achieve higher efficiency, compared with the case in which the switch 5 is turned off.

In the present preferred embodiment, the operation of the switching power supply apparatus 1 in the drive state or the frozen state depending on the amount of charge in the secondary battery 3 allows an annual accumulated power usage [Wh] of a device (for example, a copier machine) having the switching power supply apparatus 1 installed therein to be greatly reduced, compared with an efficiency improvement technology in related art. Reasons why the accumulated power usage [Wh] is not sufficiently reduced with the efficiency improvement technology in the related art will be described below.

In a configuration in the related art, the secondary battery is provided, as in the present preferred embodiment, and the voltage from the commercial power supply is supplied to the load when the load 101 is in a rated load state (a so-called operation mode) and the charge voltage in the secondary battery is supplied to the load when the load 101 is at the light load (a so-called standby mode). The supply of the power to the load is efficiently performed depending on the state at the load side in the above manner to reduce the amount of power supply per unit time, thus realizing the improvement in the efficiency in the efficiency improvement technology in the related art.

Figure 2:
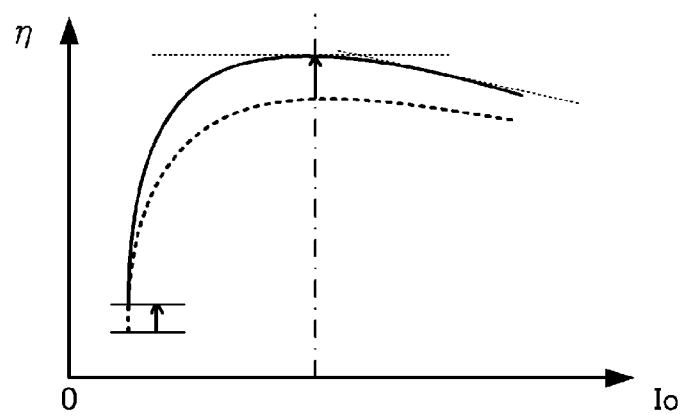
FIG. 2 is a diagram illustrating an efficiency curve in an efficiency improvement technology in related art.

FIG. 2 is a diagram illustrating an efficiency curve in the efficiency improvement technology in the related art. In the graph illustrated in FIG. 2, the horizontal axis represents output current Io and the vertical axis represents efficiency $\eta$ of the power supply. The load side is at the heavy load when the output current Io is large and the load side is at the light load when the output current Io is small. The efficiency $\eta$ is equal to Po/Pi ($\eta$=Po/Pi) wherein Pi denotes input power and Po denotes output power. The input power Pi is equal to Po+P$_{loss}$ (Pi=Po+P$_{loss}$) wherein P$_{loss}$ denotes power loss.

Improvement of the efficiency η from a broken-line curve to a solid-line curve with the efficiency improvement technology in the related art is illustrated in FIG. 2. In the related art, the power loss is reduced by, for example, improving the performance of electronic devices in a power conversion circuit to increase the entire efficiency η from the light load to the heavy load, as illustrated in FIG. 2, thus entirely reducing the power loss. However, the efficiency η at the light load is still low in this case. For example, in the case of a copier machine, since the time of the light load (the standby mode) in one day is longer than the time of the rated load state (the operation mode), higher improvement rate (the reduction in the accumulated power usage [Wh]) is not expected if the improvement rate of the efficiency η at the light load is low.

Reasons why the accumulated power usage [Wh] is largely reduced with the switching power supply apparatus 1 according to the present preferred embodiment will be described below.

Figure 3:
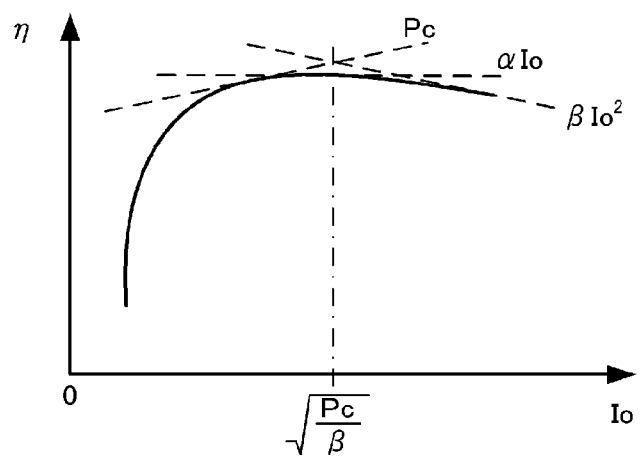
FIG. 3 is a graph for describing a peak value of efficiency $\eta$.

FIG. 3 is a graph for describing a peak value of the efficiency η. In general, the power loss P$_{loss}$ in the isolated converter is represented by the sum of loss (proportional loss) αIo) proportional the output current, loss (fixed loss) Pc that has no relationship to the output current, and loss (square proportional loss) βIo$^2$ proportional to the square of the output current. The efficiency η is represented by the following Equation (1):

Formula 1

$$\eta = \frac{Po}{Po + P_{loss}} \quad (1)$$

$$= \frac{Vo \cdot Io}{Vo \cdot Io + (Pc + \alpha Io + \beta Io^2)}$$

$$= \frac{Vo}{Vo + \left(\frac{Pc}{Io} + \alpha + \beta Io\right)}$$

As illustrated in FIG. 3, since the fixed loss Pc has no relationship to the output current, the ratio of the fixed loss Pc to the output current is decreased with the increasing output current. In other words, the efficiency η based on the fixed loss Pc is increased with the increasing output current. In contrast, the ratio of the square proportional loss βIo$^2$ to the output current is increased with the increasing output current. In other words, the efficiency η based on the square proportional loss βIo$^2$ is decreased with the increasing output current. Accordingly, the efficiency η has the peak value when the fixed loss Pc is equal to the square proportional loss βIo$^2$. The efficiency η has the peak value when Pc/Io=βIo and the efficiency η is maximized when Io=√(Pc/β).

Figure 4:
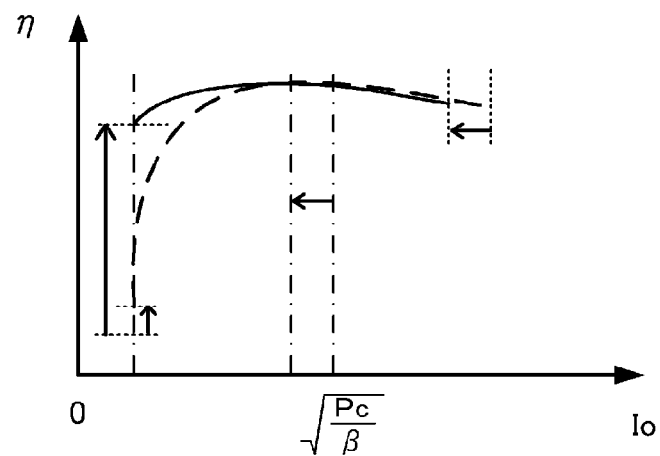
FIG. 4 is a diagram illustrating an efficiency curve in the switching power supply apparatus according to the first preferred embodiment of the present invention.

FIG. 4 is a diagram illustrating an efficiency curve in the switching power supply apparatus 1 according to the present preferred embodiment. Great improvement of the power efficiency at the light load by moving the peak value of the efficiency η (Io=√(Pc/β)) toward the light load side is illustrated in FIG. 4. In order to greatly improve the power efficiency, it is necessary to make Io=√(Pc/β) small. If β is increased, the square proportional loss βIo$^2$ is increased to disadvantageously increase the power loss. Accordingly, it is necessary to decrease the fixed loss Pc.

However, since the fixed loss Pc has no relationship to the output current Io, it is necessary to use variable loss related to the output current Io in order to decrease the fixed loss Pc. Conversion of the fixed loss into the variable loss is enabled by varying a period during which the isolated converter 2 is in the drive state and a period during which the isolated converter 2 is in the frozen state depending on the weight or level of the load 101 to supply the power. Specifically, the isolated converter 2 is caused to operate in a high-efficiency state to charge the secondary battery 3 and to supply the power from the secondary battery 3 to the load 101 in the frozen state if the amount of charge in the secondary battery 3 is lower than or equal to the threshold value even at the light load. Since the isolated converter 2 has the efficiency characteristics in which the power conversion efficiency at the rated load is higher than the power conversion efficiency at the light load, the drive state in which the power is supplied from the isolated converter 2 to the DC-DC converter 4 and the secondary battery 3 is the high-efficiency state. Accordingly, the power loss in the frozen state is infinitely close to zero.

Figure 5:
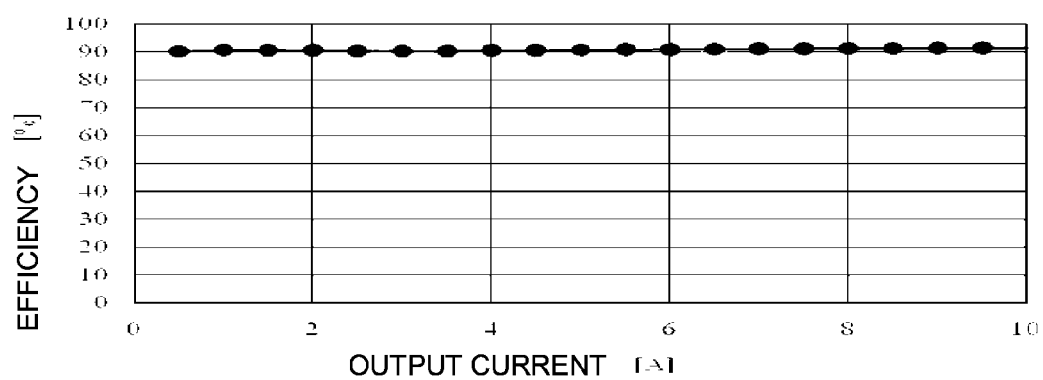
FIG. 5 is a diagram illustrating efficiency characteristics in which a period during which a frozen state occurs is varied depending on the weight or level of a load to vary output power.

FIG. 5 is a diagram illustrating efficiency characteristics in which the period during which the isolated converter 2 is in the frozen state is varied depending on the weight or level of the load to vary the output power. As illustrated in FIG. 5, the efficiency characteristics of the entire switching power supply apparatus 1 are constantly high regardless of the current through the load and the output current Io despite the fact that the isolated converter 2 achieving the efficiency characteristics illustrated in FIG. 3 is used.

Figure 6A:
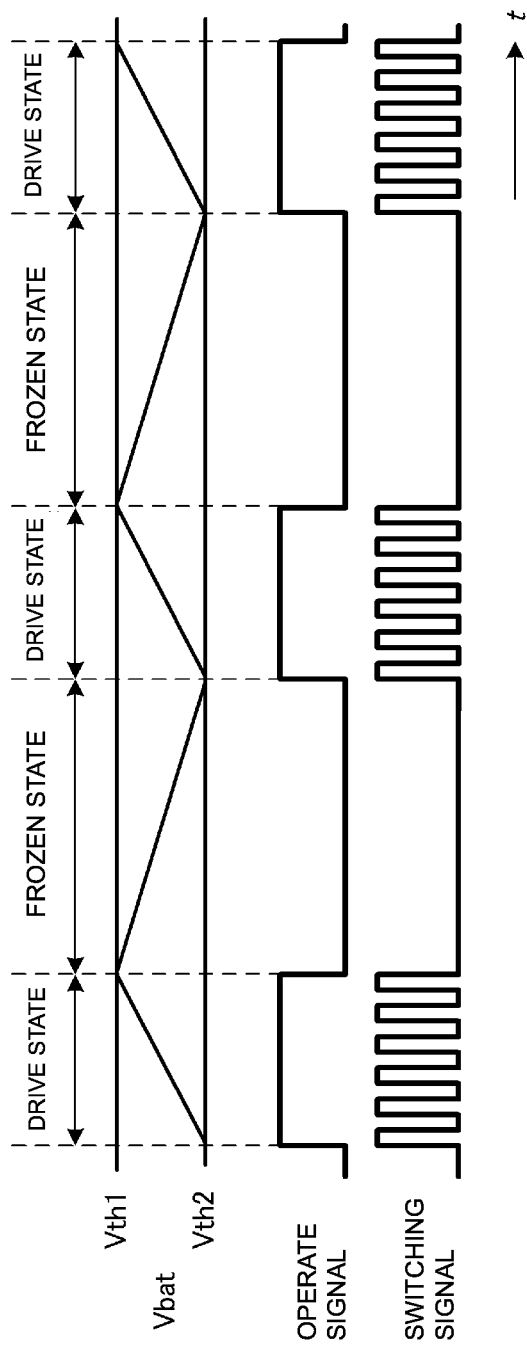
FIG. 6A is a diagram illustrating the periods of the frozen state and a drive state.

FIG. 6 includes diagrams illustrating the periods of the frozen state and the periods of the drive state in the standby mode. The state in FIG. 6B is at a load lighter than the load in the state in FIG. 6A. In each of the diagrams in FIG. 6A and FIG. 6B, the charge voltage in the secondary battery 3 is illustrated in an upper portion, and a control signal of the MCU 7 and a signal to control the operation of the isolated converter 2 are illustrated in a lower portion.

The secondary battery 3 is in the full charge if charge voltage Vbat is equal to Vth1 (the first threshold value) and the secondary battery 3 is required to be charged if the charge voltage Vbat is equal to Vth2 (the second threshold value). Accordingly, the charge voltage Vbat is increased from Vth2 to Vth1 in the drive state and the charge voltage Vbat is decreased from Vth1 to Vth2 in the frozen state. The period of the drive state is substantially constant regardless of the load in the light load state while the slope of the charge voltage Vbat in the frozen state becomes gentle when the load is further decreased. Accordingly, the period of the frozen state is lengthened. The further increase in the length of the period of the frozen state means that the period of the state in which the isolated converter 2 is stopped is lengthened. Since the increase in the length of the period of the frozen state increases the time in which no current flows through the isolated converter 2, the loss at the isolated converter 2 during the period of the frozen state is equal to zero to reduce the average loss of the switching power supply apparatus 1. Accordingly, it is possible to greatly reduce the accumulated power usage [Wh] at the light load.

Second Preferred Embodiment

Figure 7:
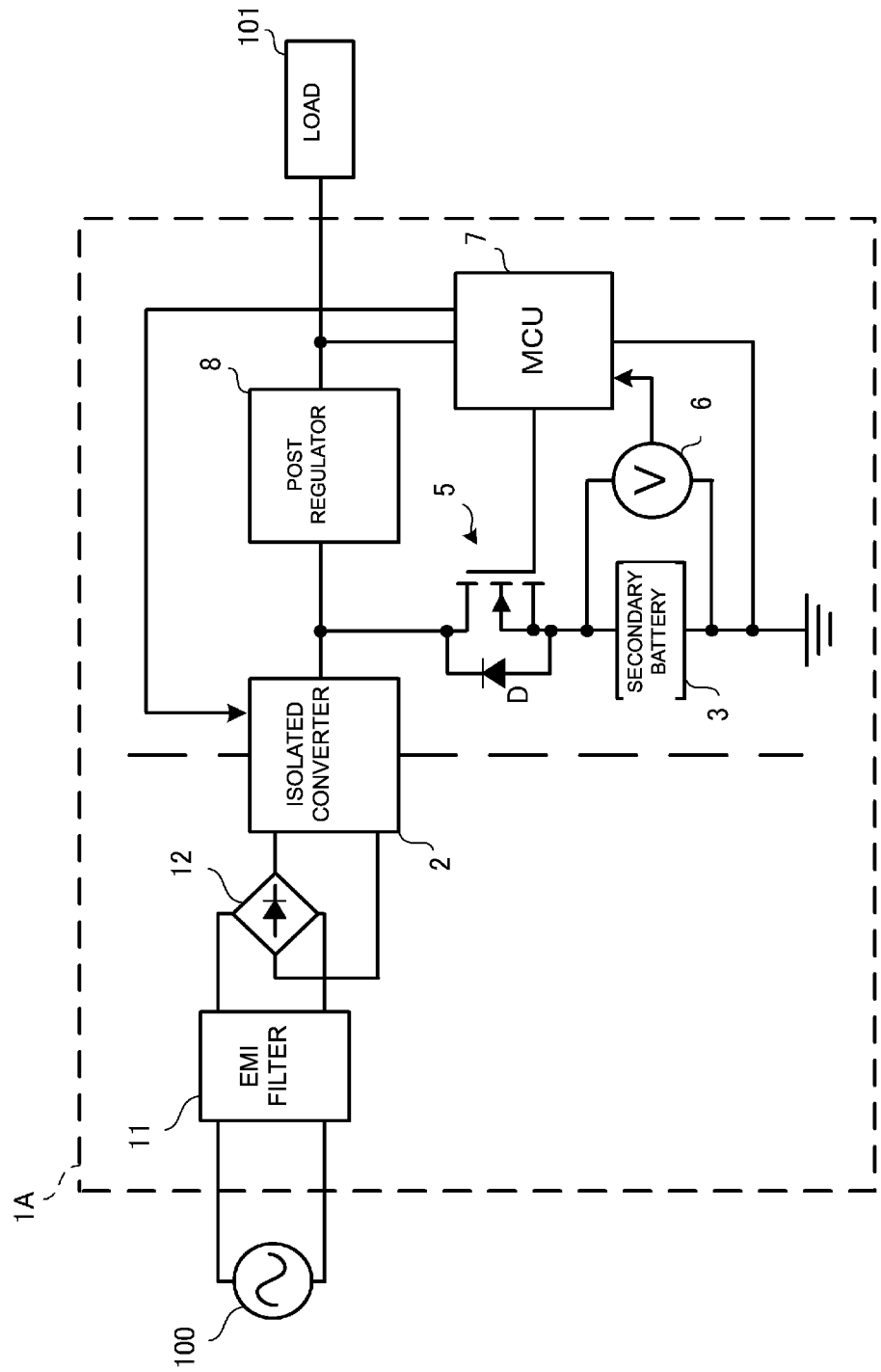
FIG. 7 is a circuit diagram of a switching power supply apparatus according to a second preferred embodiment of the present invention.

FIG. 7 is a circuit diagram of a switching power supply apparatus according to a second preferred embodiment of the present invention. In the present preferred embodiment, a switching power supply apparatus 1A includes a post regulator (dropper) 8 configured to reduce high-frequency ripples, instead of the DC-DC converter 4 in the first preferred embodiment. The switching power supply apparatus 1A including the post regulator 8 is capable of reducing the size of the circuit, compared with the case in which the DC-DC converter 4 is included. Since the other configuration and operation of the switching power supply apparatus 1A are similar to the ones in the first preferred embodiment, a description of these is omitted herein.

Third Preferred Embodiment

Figure 8:
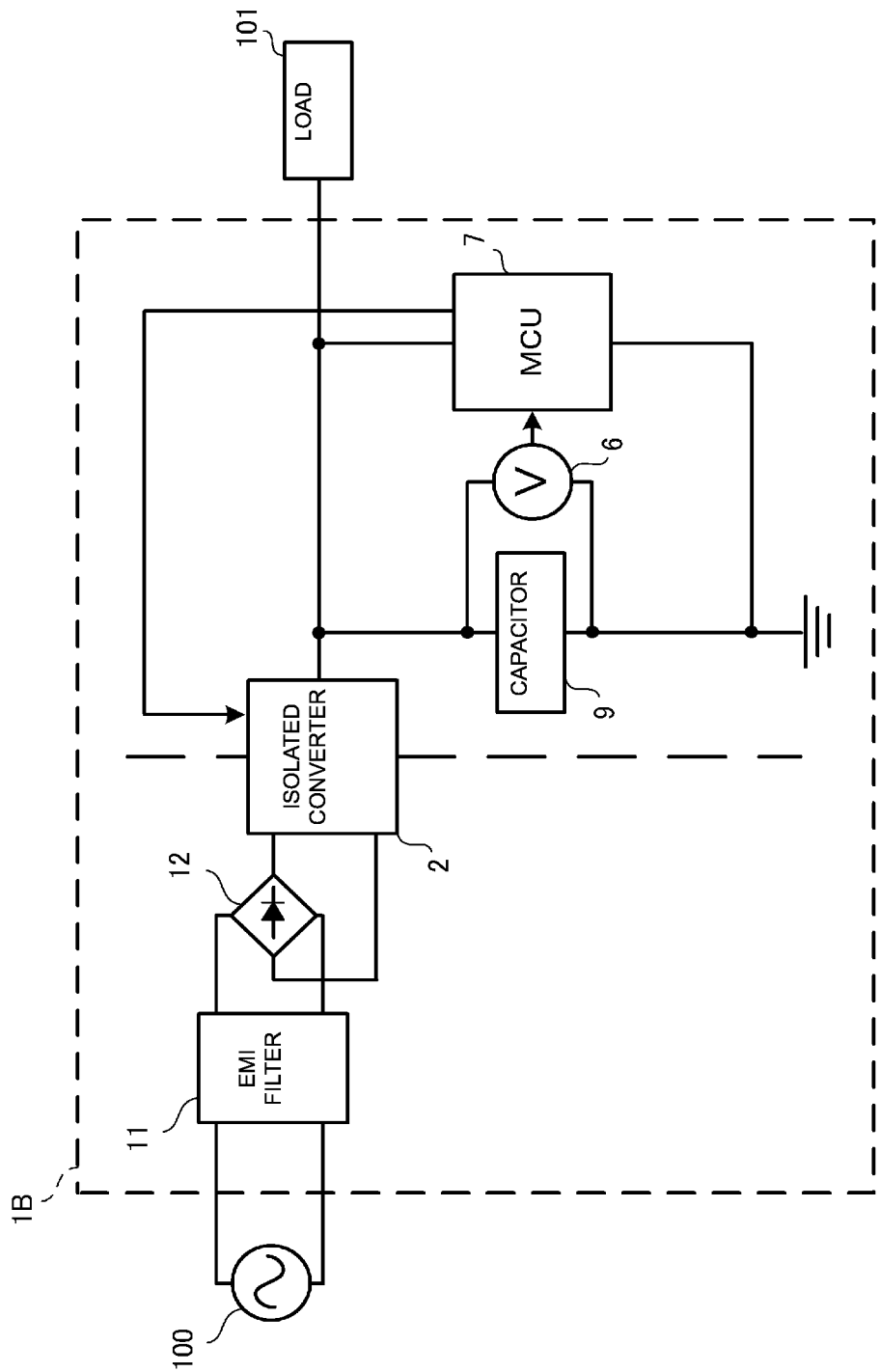
FIG. 8 is a circuit diagram of a switching power supply apparatus according to a third preferred embodiment of the present invention.

FIG. 8 is a circuit diagram of a switching power supply apparatus according to a third preferred embodiment of the present invention. A switching power supply apparatus 1B according to the present preferred embodiment includes a capacitor 9 as the charge unit. The provision of the capacitor 9 in the switching power supply apparatus 1B allows the life of the charge unit to be lengthened, compared with the case in which the secondary battery 3 is provided as in the first preferred embodiment. The capacitor 9 is not in the overcharge and it is possible to prevent the capacitor 9 from being in overvoltage on the basis of the voltage of the voltage detector 6 under the control of the MCU 7. Accordingly, it is not necessary to provide the switch 5 of the first preferred embodiment to reduce the number of devices in the switching power supply apparatus 1B. The capacitor 9 accumulates the electric charge as electrostatic energy while the secondary battery 3 accumulates the electricity with electrochemical reaction. In other words, the internal resistance of the capacitor 9 is lower than that of the secondary battery 3. Consequently, it is possible to shorten the charge time of the capacitor 9, compared with the charge time of the secondary battery 3. Since the use of the capacitor 9 allows the period of the drive state to be shortened and allows the period of the frozen state to be relatively lengthened, it is possible to reduce the loss in the isolated converter 2. Although the switching power supply apparatus 1B illustrated in FIG. 8 does not include the post regulator, the switching power supply apparatus 1C may include the post regulator.

Figure 9:
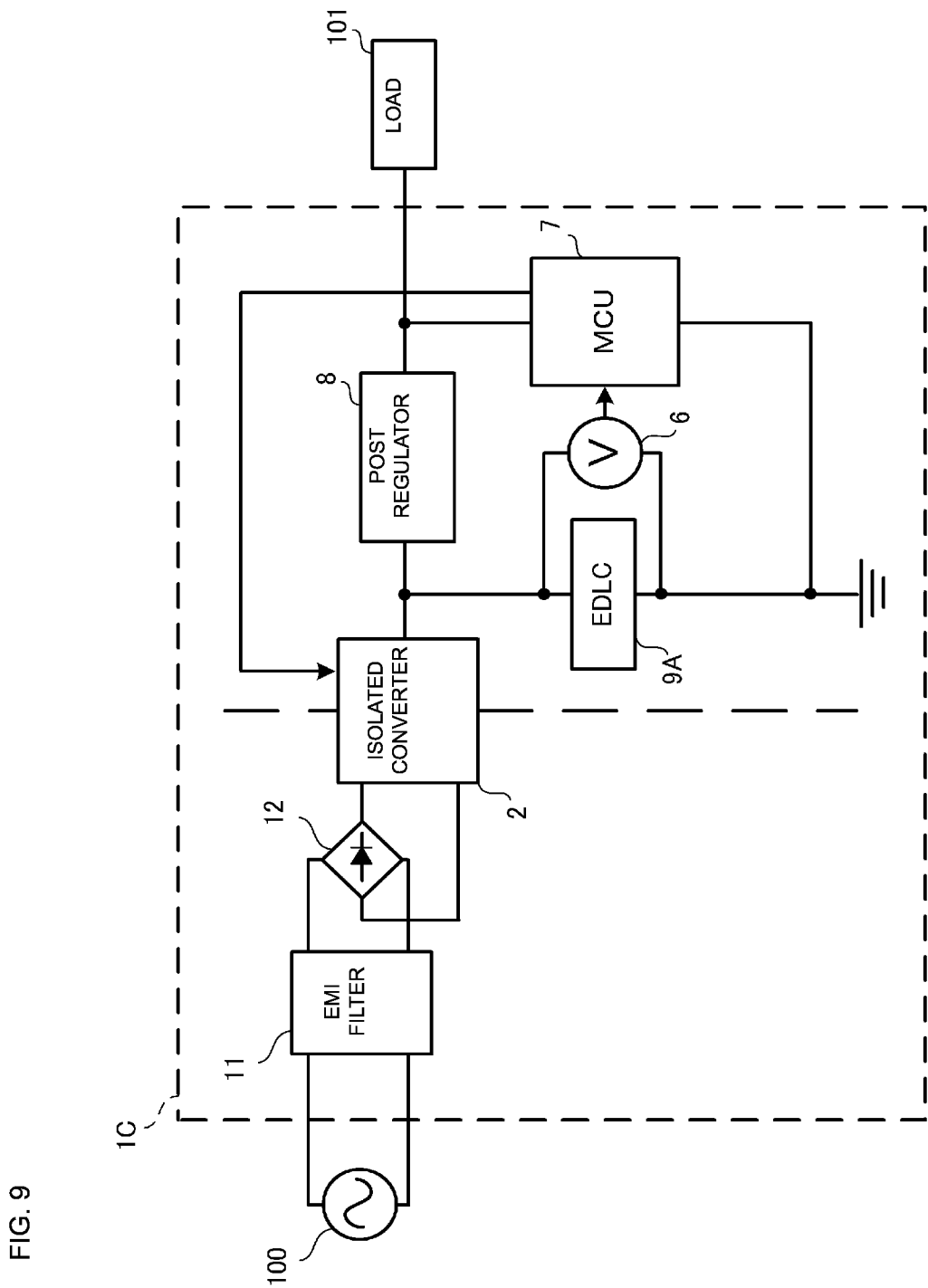
FIG. 9 is a diagram illustrating a modification of the switching power supply apparatus according to the third preferred embodiment of the present invention.

FIG. 9 is a diagram illustrating a modification of the switching power supply apparatus according to the third preferred embodiment. A switching power supply apparatus 1C includes an electric double layer capacitor 9A. Since the electric double layer capacitor 9A may have a capacitance higher than the capacitances of normal capacitors, it is possible to lengthen the period of the frozen state to more greatly reduce the accumulated power usage [Wh] in the switching power supply apparatus 1C. Although the switching power supply apparatus 1C illustrated in FIG. 9 includes the post regulator 8, the switching power supply apparatus 1C may not include the post regulator 8.

Fourth Preferred Embodiment

Figure 10:
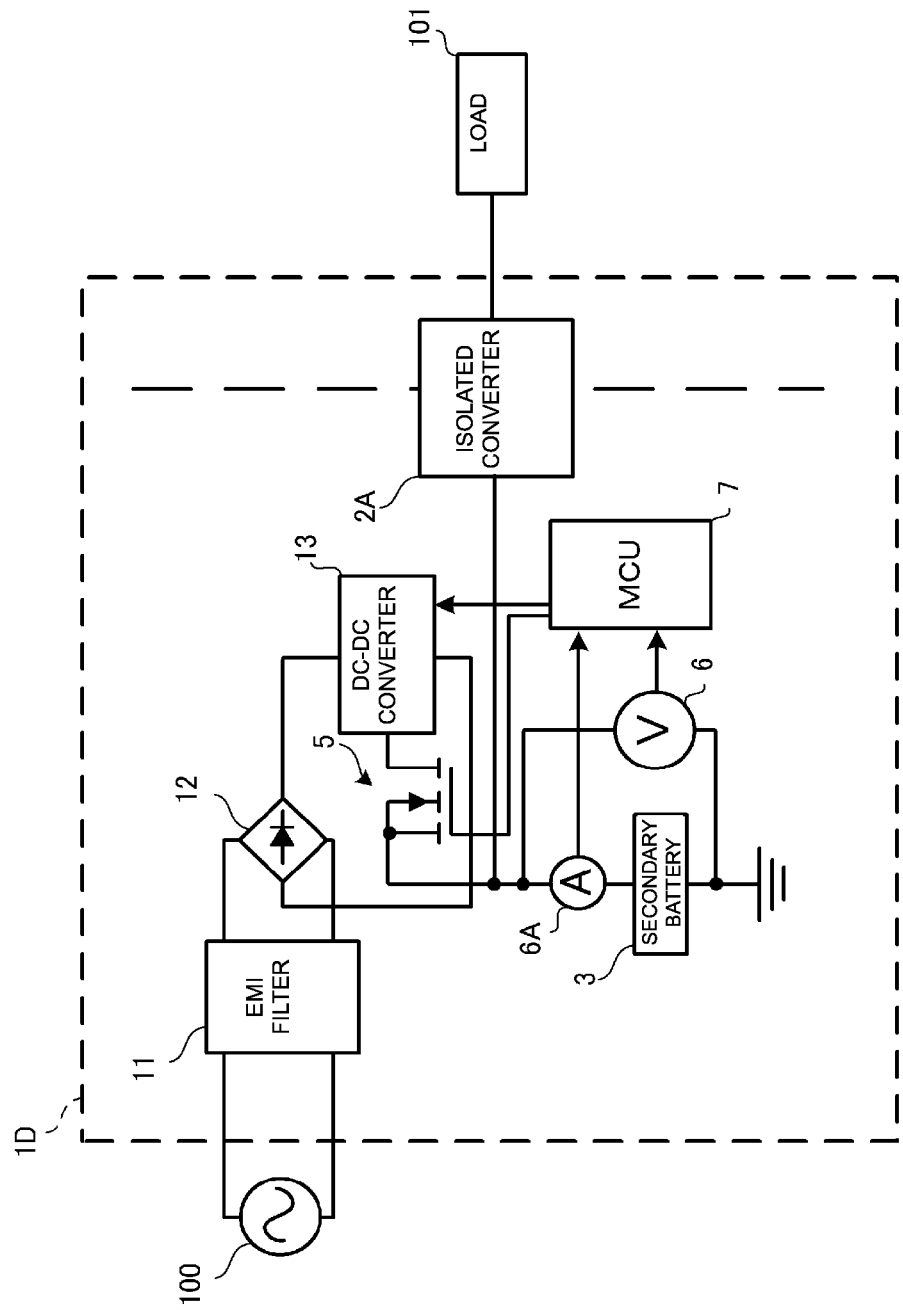
FIG. 10 is a circuit diagram of a switching power supply apparatus according to a fourth preferred embodiment of the present invention.

FIG. 10 is a circuit diagram of a switching power supply apparatus 1D according to a fourth preferred embodiment of the present invention. The switching power supply apparatus 1D according to the present preferred embodiment includes an isolated DC-DC converter (hereinafter referred to as an isolated converter) 2A defining and serving as an isolated second converter of the present invention. The switching power supply apparatus 1D includes the EMI filter 11, the diode bridge circuit 12, the DC-DC converter (the first converter) 13, the secondary battery 3, the switch 5, the MCU 7, and so on at its primary side. The driving of the DC-DC converter 13 is controlled by the MCU 7. The DC-DC converter 13 converts the alternating-current voltage subjected to the full-wave rectification in the diode bridge circuit 12 into the direct-current voltage. The turning on and off of the switch 5 is controlled by the MCU 7. When the switch 5 is turned on, the direct-current voltage from the DC-DC converter 13 is supplied to the secondary battery 3, which is charged with the voltage, and is supplied to the isolated DC-DC converter 2A. When the switch 5 is turned off, the direct-current voltage stored in the secondary battery 3 is supplied to the isolated DC-DC converter 2A.

In the present preferred embodiment, in addition to the voltage detector 6 detecting the charge voltage in the secondary battery 3, a current detector 6A detecting direct current to be supplied to the secondary battery 3 is provided. The current detector 6A detects the direct current to be supplied to the secondary battery 3, and the MCU 7 reads out the direct current to be supplied to the secondary battery 3 from the result of the detection, if needed. Since the direct current value is decreased when the secondary battery 3 is in the full charge, the MCU 7 determines whether the secondary battery 3 is in the full charge on the basis of the direct current that is input to control the turning on and off of each switch. The switching power supply apparatus 1D may include only either of the voltage detector 6 and the current detector 6A.

In the present preferred embodiment, it is possible to reduce the accumulated power usage [Wh], as in the first preferred embodiment, and the provision of the secondary battery 3 and so on at the primary side when the size at the secondary side of the isolated DC-DC converter 2A is increased due to the provision of safety standards, etc. allows the increase in the size at the secondary side to be suppressed.

Fifth Preferred Embodiment

Figure 11:
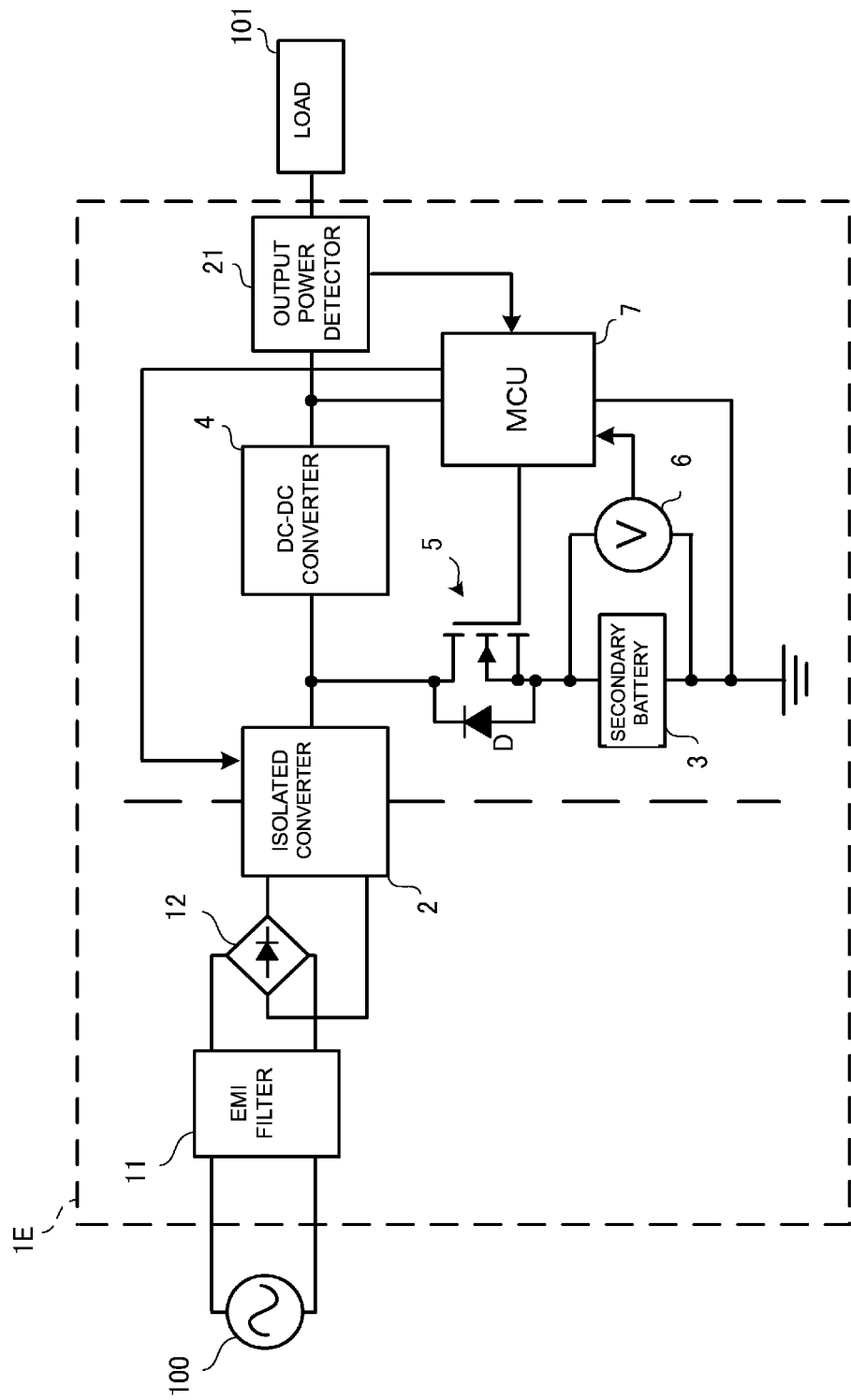
FIG. 11 is a circuit diagram of a switching power supply apparatus according to a fifth preferred embodiment of the present invention.

FIG. 11 is a circuit diagram of a switching power supply apparatus 1E according to a fifth preferred embodiment of the present invention. The switching power supply apparatus 1E according to the fifth preferred embodiment does not cause the isolated converter 2 to be in the frozen state but forcedly causes the isolated converter 2 to be in the drive state if the output voltage to the load 101 is high even when the amount of charge in the secondary battery 3 is higher than or equal to the threshold value (the full charge). The switching power supply apparatus 1E includes an output power detector 21 detecting the output voltage to the load 101, in addition to the components of the switching power supply apparatus 1 of the first preferred embodiment. The MCU 7 causes the isolated converter 2 to operate and performs the control so that the direct-current voltage from the isolated converter 2 is supplied to the load 101 if the output voltage to the load 101, which is acquired from the result of the detection in the output power detector 21, is higher than or equal to a certain value (a third threshold value). The certain value is, for example, the power consumption at the rated load.

At the output voltage that is high, that is, in the rated load state (the operation mode), the rate of discharge from the secondary battery 3 is high and the amount of charge in the secondary battery 3 is rapidly decreased when the direct-current voltage is supplied from the secondary battery 3 in the frozen state. Accordingly, the control in which the charge into the secondary battery 3 is started a short time after the discharge from the secondary battery 3 is repeated. As a result, the number of times of charge and discharge into and from the secondary battery 3 is increased to decrease the life of the secondary battery 3. Consequently, in the rated load state, the direct-current voltage is supplied from the isolated converter 2 to the load 101 regardless of the amount of charge in the secondary battery 3. When the secondary battery 3 is in the full charge, the MCU 7 turns off the switch 5 to stop the charge into the secondary battery 3. This prevents the overcharge into the secondary battery 3 to protect the secondary battery 3.

Figure 12:
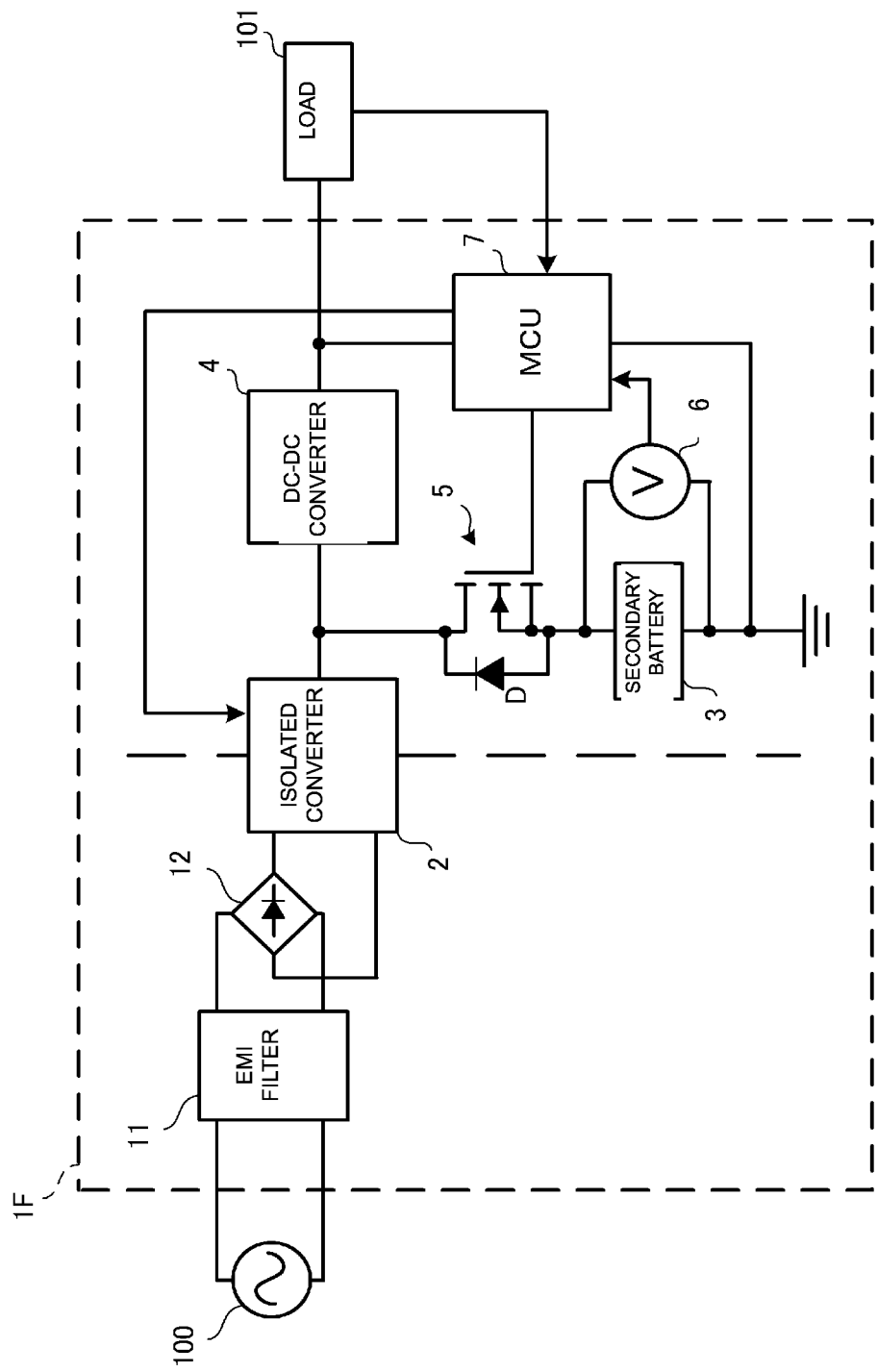
FIG. 12 is a diagram illustrating a modification of the switching power supply apparatus according to the fifth preferred embodiment of the present invention.

FIG. 12 is a diagram illustrating a modification of the switching power supply apparatus 1E according to the fifth preferred embodiment. The MCU 7 in a switching power supply apparatus 1F illustrated in FIG. 12 determines whether the load 101 is in the rated load state (the operation mode) or in the light load state to set the isolated converter 2 to the drive state or the frozen state on the basis of the result of the determination. For example, the MCU 7 receives an external signal to determine the state of the load 101. The circuit that transmits the external signal is a circuit to determine the state of the load 101. The circuit may be provided in the load 101 or may be provided separately from the load 101. If the MCU 7 determines that the load 101 is in the rated load state, the MCU 7 sets the isolated converter 2 to the drive state to turn off the switch 5 even when the amount of charge in the secondary battery 3 is higher than or equal to the threshold value (in the full charge).

In the rated load state, the rate of discharge from the secondary battery 3 is high and the amount of charge in the secondary battery 3 is rapidly decreased when the direct-current voltage is supplied from the secondary battery 3 in the frozen state. Accordingly, the control in which the charge into the secondary battery 3 is started a short time after the discharge from the secondary battery 3 is repeated. As a result, the number of times of charge and discharge into and from the secondary battery 3 is increased to decrease the life of the secondary battery 3. Consequently, in the rated load state, the isolated converter 2 is forcedly set to the drive state to supply the direct-current voltage from the isolated converter 2 to the load 101 regardless of the amount of charge in the secondary battery 3. When the secondary battery 3 is in the full charge, the MCU 7 turns off the switch 5 to stop the charge into the secondary battery 3. This prevents the overcharge into the secondary battery 3 to protect the secondary battery 3.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
   a first converter configured to have efficiency characteristics in which power conversion efficiency of a rated load is higher than power conversion efficiency of a light load and that converts power-supply voltage that is input into direct-current voltage to output the direct-current voltage;
   a charge unit configured to store the direct-current voltage output from the first converter;
   an amount-of-charge detecting unit configured to detect an amount of charge in the charge unit; and
   a controller configured and programmed to switch driving and stopping of the first converter based on the amount of charge detected by the amount-of-charge detecting unit; wherein
   the controller is configured and programmed to stop the first converter if the amount of charge in the charge unit is higher than a first threshold value and drive the first converter if the amount of charge in the charge unit is lower than a second threshold value regardless of a current through a load;
   the controller is configured and programmed to output the direct-current voltage subjected to the conversion in the first converter and store the direct-current voltage subjected to the conversion in the first converter in the charge unit when the first converter is driven and output the direct-current voltage stored in the charge unit when the first converter is stopped;
   a frozen period, during which the first converter is stopped to be in a frozen state, is controlled depending on an amount of power, which is defined by a product of power and time, consumed by the load and the frozen period is lengthened as the amount of power decreases; and
   depending on a level of the load, power is supplied by varying a period during which the first converter is in a drive state and a period during which the first converter is in the frozen state, which is an input power of 0, converting fixed loss which is not related to the current into variable loss which is related to the current, such that efficiency is almost constant regardless of the current through the load.

2. The switching power supply apparatus according to claim 1, further comprising a voltage conversion unit configured to perform voltage conversion of the direct-current voltage output from the charge unit.

3. The switching power supply apparatus according to claim 2, wherein the voltage conversion unit is a DC-DC converter.

4. The switching power supply apparatus according to claim 1, further comprising:
   an isolated second converter; wherein
   the first converter, the charge unit, and the controller are provided at a primary side of the second converter.

5. The switching power supply apparatus according to claim 1, wherein the charge unit is a secondary battery.

6. The switching power supply apparatus according to claim 1, wherein the charge unit is a capacitor.

7. The switching power supply apparatus according to claim 6, wherein the charge unit is an electric double layer capacitor.

8. The switching power supply apparatus according to claim 1, wherein a rectifier circuit in the first converter is a synchronous rectifier circuit.

9. The switching power supply apparatus according to claim 1, further comprising:
   an output power detecting unit configured to detect output voltage to an external load; and
   a charge stopping unit configured to stop supply of the direct-current voltage to the charge unit when the charge unit is in full charge; wherein
   the controller is configured and programmed to forcedly drives the first converter to be in the drive state regardless of the amount of charge in the charge unit if the output voltage detected by the output power detecting unit exceeds a third threshold value, and the power is supplied by varying a period during which the first converter is in the drive state and a period during which the first converter is in the frozen state if the output voltage detected by the output power detecting unit is less than the third threshold value.

10. The switching power supply apparatus according to claim 1, further comprising:

a charge stopping unit configured to stop supply of the direct-current voltage to the charge unit if the charge unit is in full charge; wherein the controller is configured and programmed to determine whether an external load is in a rated load state or in a light load state; and the controller is configured and programmed to forcedly drive the first converter to be in the drive state regardless of the amount of charge in the charge unit if the controller determines that the external load is in the rated load state, and the power is supplied by varying a period during which the first converter is in the drive state and a period during which the first converter is in the frozen state if the controller determines that the external load is in the light load state.

11. The switching power supply apparatus according to claim 1, wherein the first converter is an isolated DC-DC converter.

12. The switching power supply apparatus according to claim 1, further comprising an electromagnetic interference filter and a diode bridge circuit at a primary side.

13. The switching power supply apparatus according to claim 1, further comprising a post regulator configured to reduce high-frequency ripples.

14. The switching power supply apparatus according to claim 1, further comprising a second converter.

15. The switching power supply apparatus according to claim 14, wherein each of the first converter and the second converter is an isolated DC-DC converter.

16. The switching power supply apparatus according to claim 1, wherein the charge unit includes at least one of a voltage detector and a current detector.

* * * * *